United States Patent
Hsu et al.

(10) Patent No.: US 12,175,129 B2
(45) Date of Patent: Dec. 24, 2024

(54) READ DATA ALIGNMENT

(71) Applicant: Micron Technology, Inc., Boise, ID (US)

(72) Inventors: Yu-Sheng Hsu, San Jose, CA (US); Chihching Chen, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 99 days.

(21) Appl. No.: 17/968,015

(22) Filed: Oct. 18, 2022

(65) Prior Publication Data

US 2024/0126477 A1     Apr. 18, 2024

(51) Int. Cl.
G06F 3/06     (2006.01)

(52) U.S. Cl.
CPC .......... *G06F 3/0659* (2013.01); *G06F 3/0604* (2013.01); *G06F 3/0683* (2013.01)

(58) Field of Classification Search
CPC ..... G06F 3/0659; G06F 3/0604; G06F 3/0683
See application file for complete search history.

(56) References Cited

U.S. PATENT DOCUMENTS

| | | | | |
|---|---|---|---|---|
| 8,533,403 B1* | 9/2013 | Law | .................... | G06F 13/1605 |
| | | | | 711/158 |
| 2006/0107011 A1* | 5/2006 | Nystuen | .............. | G06F 13/4234 |
| | | | | 711/167 |
| 2012/0179860 A1* | 7/2012 | Falanga | ................ | G11C 16/102 |
| | | | | 711/155 |
| 2012/0311371 A1* | 12/2012 | Shaeffer | ................ | G06F 13/287 |
| | | | | 713/501 |
| 2013/0061003 A1* | 3/2013 | Millet | .................. | G06F 13/4022 |
| | | | | 711/141 |
| 2016/0357454 A1* | 12/2016 | Lee | ........................ | G06F 13/385 |
| 2020/0057571 A1* | 2/2020 | Sato | ........................ | G06F 3/0655 |
| 2021/0343318 A1* | 11/2021 | Shallal | ................... | G11C 7/1045 |
| 2022/0224776 A1 | 7/2022 | Doshi et al. | | |
| 2022/0261165 A1 | 8/2022 | Wang et al. | | |
| 2022/0269602 A1 | 8/2022 | Kim et al. | | |
| 2023/0113953 A1* | 4/2023 | Pappu | ..................... | G06F 1/325 |

* cited by examiner

*Primary Examiner* — Henry Tsai
*Assistant Examiner* — Aurangzeb Hassan
(74) *Attorney, Agent, or Firm* — Brooks, Cameron & Huebsch, PLLC

(57) ABSTRACT

Systems, apparatuses, and methods related to a controller architecture for read data alignment are described. An example method can include sending a first notification from a physical layer to each of a number of memory controllers, wherein the first notification indicates that the physical layer and/or a memory device coupled to the physical layer is busy, and blocking commands on each of the number of memory controllers in response to receiving the first notification to cause read data alignment. The method can also include sending a second notification from the physical layer to each of the number of memory controllers, wherein the second notification indicates that the physical layer and/or the memory device coupled to the physical layer is no longer busy, and resuming processing commands on each of the number of memory controllers in response to receiving the second notification.

20 Claims, 4 Drawing Sheets

READ DATA ALIGNMENT

TECHNICAL FIELD

The present disclosure relates generally to semiconductor memory and methods, and more particularly, to apparatuses, systems, and methods for read data alignment.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
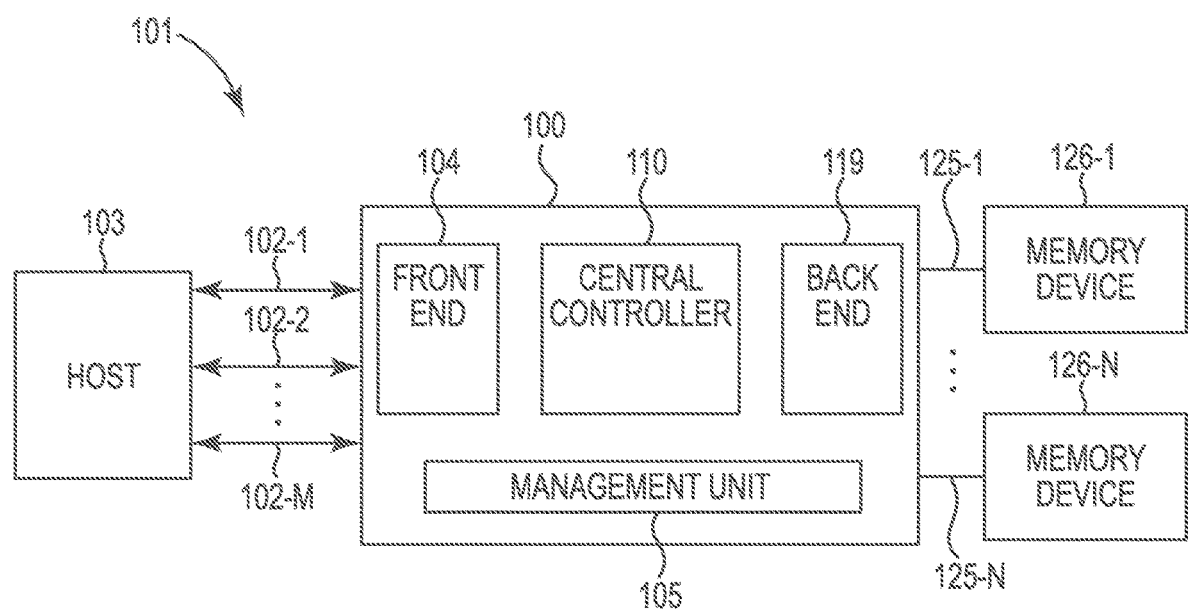
FIG. 1 is a block diagram of a computing system including a memory controller in accordance with a number of embodiments of the present disclosure.

Systems, apparatuses, and methods related to a controller architecture for read data alignment are described. The controller can be within a memory system, which can be a memory module, a storage device, or a hybrid of a memory module and a storage device. The memory controller can be coupled to a number of memory devices via a number of memory channels which can be organized as a number of channel groups.

A number of memory channels can work independently or work together as a whole. When the number of memory channels are working together, read data must arrive at a central controller before any further processing of the read data. Therefore if the read data is not returned at the same time or in a different order, the central controller will not be able to further processes the read data which can add latency to the memory system. This latency can be introduced by a physical layer on a PHY memory interface triggering training, the central controller issuing different commands to memory controllers on the number of memory channels, memory controller registers being programmed at different times, and/or memory controllers running at different clock times, among other causes for latency.

In a number of embodiments of the present disclosure, a central controller can be coupled to a number of memory controllers via a command bus. The command bus can couple the central controller to each of the number of memory controllers. When the central controller issues commands, the commands are sent to each of the number of memory controllers on the command bus. The central controller sends commands on the command bus such that each of the number of memory command receive the commands, therefore sending the commands on the command bus from the central controller to the number of memory controllers can reduce and/or eliminate any latency in the memory system cause different commands being received amongst the number of memory controllers.

In a number of embodiments of the present disclosure, a central controller can be coupled to a number of memory controllers via a data bus. The data bus can couple the central controller to each of the number of memory controllers. When the number of memory controllers are sending data to the central controller (in response to the command received from the central control via the command bus, the read data is sent to from each of the number of memory controllers on the data bus to a data buffer on the central controller. The number of memory controllers can send read data on the data bus such that the central controller receives the read data that corresponds to the commands sent to the memory controllers from the central controller via the command bus, therefore sending read data on the data bus, that couples the central controller to each of the number of memory controllers, from the number of memory controllers to the central controller can reduce and/or eliminate any latency in the memory system cause different commands being received amongst the number of memory controllers.

In a number of embodiments of the present disclosure, a number of memory controllers can be coupled to physical layers on a number of PHY memory interfaces via a sideband bus. The side-band bus can include a logic gate such that any signal sent from one of the physical layers on the side-band bus will be sent to each of the number of memory controllers. When one of the physical layers is busy (e.g., busy requesting training), a notification (e.g., a signal) that the physical layer is busy can be sent on the side-band bus to the logic gate. The notification can be received by the logic gate and transmitted from the logic gate to each of the number of memory controllers on the side-band bus. When each of the number of memory controllers receives the notification, the number of memory controllers can block commands from being performed. The number of memory controllers can block command from being performed while one or more of the physical layers are busy in response to receiving the notification, therefore sending the notification on the side-band bus to each of the number of memory controllers can reduce and/or eliminate any latency in the memory system caused by one of the memory channels being unable to execute commands.

When one of the physical layers is no longer busy (e.g., training operation is complete), another notification (e.g., a signal) that the physical layer is no longer busy can be sent on the side-band bus to the logic gate. The notification can be received by the logic gate and transmitted from the logic gate to each of the number of memory controllers on the side-band bus. When each of the number of memory controllers receives the notification, the number of memory controllers can resume performing commands. The number of memory controllers can resume performing commands in response to receiving the notification that indicates one or more of the physical layers are no longer busy, therefore sending the notifications on the side-band bus to each of the number of memory controllers can reduce and/or eliminate any latency in the memory system caused by one of the memory channels being busy and unable to execute commands.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like. The terms "data" and "data values" are used interchangeably herein and can have the same meaning, as appropriate to the context.

The figures herein follow a numbering convention in which the first digit or digits correspond to the drawing figure number and the remaining digits identify an element or component in the drawing. Similar elements or components between different figures may be identified by the use of similar digits. For example, element 122 can represent element 22 in FIG. 1, and a similar element can be labeled 222 in FIG. 2. Analogous elements within a figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of a computing system 101 including a memory controller 100 in accordance with a number of embodiments of the present disclosure. The memory controller 100 includes a front end portion 104, a central controller portion 110, and a back end portion 119. The computing system 101 includes a host 103 and memory devices 126-1, . . . , 126-N coupled to the memory controller 100. The computing system 101 can be, for example, a high performance computing (HPC) data center among various other types of computing systems (e.g., servers, desktop computers, laptop computers, mobile devices, etc.).

Although not shown in FIG. 1, the front end portion 104 can include a physical (PHY) layer and a front end controller for interfacing with the host 103 over a number of buses 102-1, 102-2, . . . , 102-M, which can include a number of input/output (I/O) lanes. The number of buses 102-1, 102-2, . . . , 102-M can include various combinations of data, address, and control busses, which can be separate busses or one or more combined busses. In at least one embodiment, the interface between the memory controller 100 and the host 103 can be a peripheral component interconnect express (PCIe) physical and electrical interface operated according to a compute express link (CXL) protocol. As non-limiting examples, the number of buses 102-1, 102-2, . . . , 102-M can be a PCIe 5.0 interface operated in accordance with a CXL 2.0 specification or a PCIe 6.0 interface operated in accordance with a CXL 3.0 specification.

CXL is a high-speed central processing unit (CPU)-to-device and CPU-to-memory interconnect designed to accelerate next-generation data center performance. CXL technology maintains memory coherency between the CPU memory space and memory on attached devices such as accelerators, memory buffers, and smart I/O devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. CXL provides protocols with I/O semantics similar to PCIe (e.g., CXL.io), caching protocol semantics (e.g., CXL.cache), and memory access semantics (CXL.mem).

The central controller portion 110 can be responsible for controlling various operations associated with executing memory access requests (e.g., read commands and write commands) from the host 103. For example, as described further below, the central controller portion 110 can include various error circuitry (e.g., error detection and/or error correction circuitry) capable of generating error detection and/or error correction information for providing data reliability in association with writing data to and/or reading data from the memory devices 126. As described further herein, such error detection and/or correction circuitry can include error correcting code (ECC) circuitry, low-power chip kill (LPCK) circuitry, and/or "chip kill" circuitry, for example.

The back end portion 119 can include a number of memory channel controllers (e.g., media controllers) and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In various embodiments, the physical data transmission medium includes memory channels 125-1, . . . , 125-N. The memory channels 125-1, . . . , 125-N can be, for example, 16-bit channels to two 8-bit (x8) devices, although embodiments are not limited to a particular back end interface. As another example, the memory channels 125-1, . . . , 125-N can each also include a two pin data mask inversion (DMI) bus, among other possible bus configurations. The back end portion 119 can exchange data (e.g., user data and error detection and/or correction data) with the memory devices 126-1, . . . , 126-N via the physical pins corresponding to the respective memory channels 125-1, . . . , 125-N. As described further herein, in a number of embodiments, the memory channels 125 can be organized as a number of channel groups, with the memory channels of each group being accessed together in association with executing various memory access operations and/or error detection and/or correction operations.

The memory devices 126-1, . . . , 126-N can be, for example, dynamic random access memory (DRAM) devices operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). However, embodiments are not limited to a particular type of memory device 126-1, . . . , 126-N. For example, the memory devices 126-1, . . . , 12-N can be FeRAM devices.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
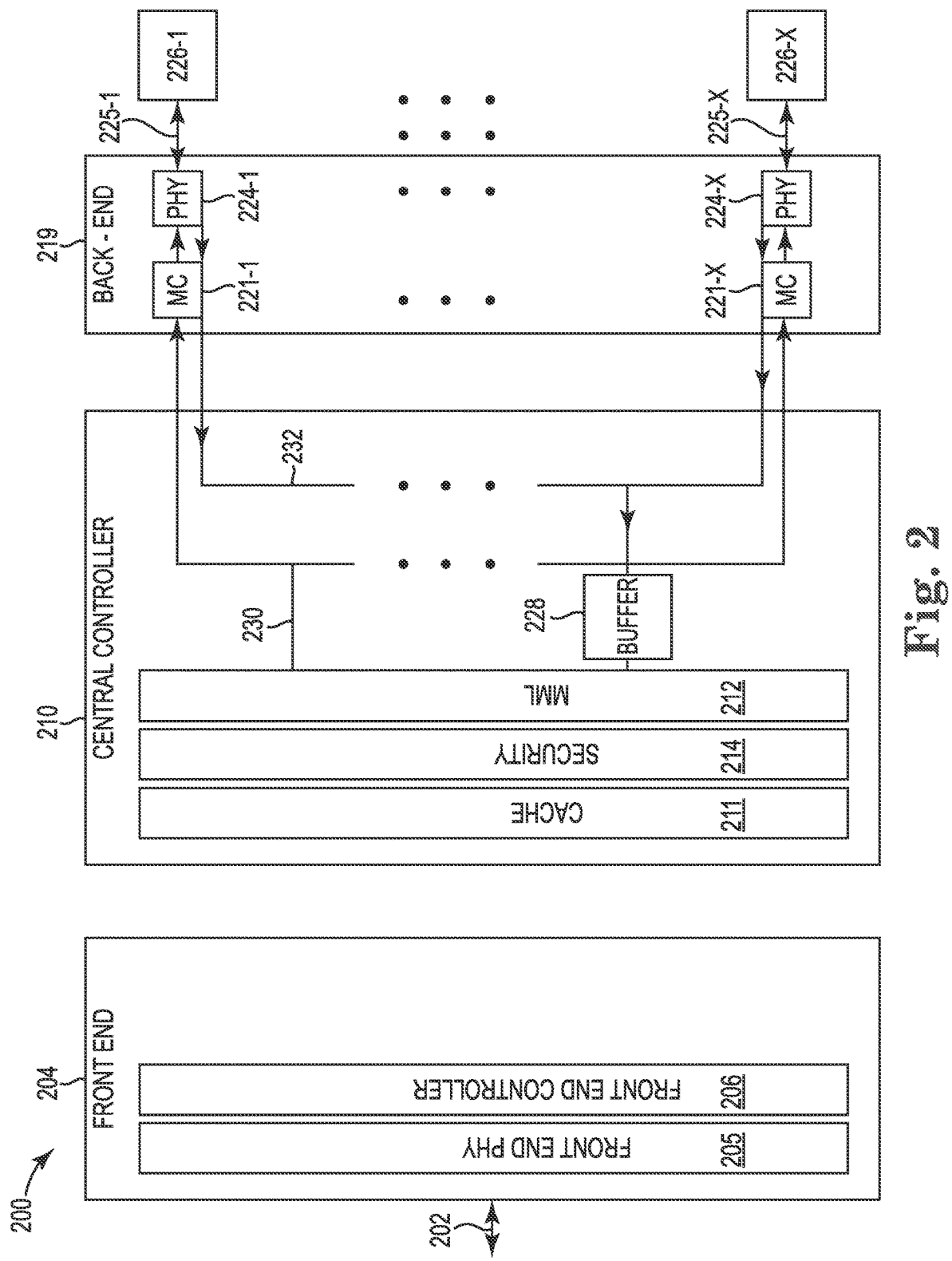
FIG. 2 is a block diagram of a controller having a number of channels coupled to a number of memory devices in accordance with a number of embodiments of the present disclosure.

FIG. 2 is a block diagram of a controller having a number of channels coupled to a number of memory devices in accordance with a number of embodiments of the present disclosure. As shown in FIG. 2, the controller 200 includes a front end portion 204, a central controller portion 210, and a back end portion 219. The controller 200 can be a controller such as controller 100 described in FIG. 1.

The front end portion 204 includes a front end PHY 205 for interfacing with a host via communication link 202, which can be a CXL link, for example. The front end 204 includes a front end controller 206 to manage the interface and communicate with the central controller portion 210. In embodiments in which the link 202 is a CXL link, the front end controller 206 is configured to receive (e.g., from a host) memory access requests, according to a CXL protocol, directed at the memory devices 226-1, . . . , 226-X.

As shown in FIG. 2, the central controller portion 210 can include a media management layer (MML) 212 that can be used to translate memory access requests in accordance with a particular protocol (e.g., CXL compliant requests) into a protocol compliant with the particular memory controller 200 and/or particular type of memory media (e.g., memory devices 226-1, . . . , 226-X). The central controller portion 210 can also include a cache 211, which can include an associated cache controller. The cache 211 can be used, for example, to temporarily store data frequently accessed (e.g., by a host).

The central controller portion 210 further includes a security component 214 to encrypt/decrypt data (e.g., an UDB corresponding to a write command). Data received from the cache 211 (e.g., data corresponding to a cache line) and in plain text form can be input (e.g., transferred) to the security component 214 and can be converted to cypher text as a result of being encrypted at the security component 214. As used herein, the UDB in cypher text form can be alternatively referred to as an "encrypted UDB", which can be alternatively referred to as an "encrypted version of an UDB". Although embodiments are not so limited, the security component 214 can operate using an AES encryption/decryption (e.g., algorithm).

As shown in FIG. 2, the memory controller 200 can include a back end portion 219 coupled to the central controller portion 210. The back end portion 219 can include memory controllers 221-1, . . . , 221-X that are respectively coupled to PHY memory interfaces 224-1, . . . , 224-X. The PHY memory interfaces 224-1, . . . , 224-X are respectively coupled to memory devices 226-1, . . . , 226-X via memory channels 225-1, . . . , 225-X.

The memory controllers 221-1, . . . , 221-X can be used substantially simultaneously to drive the channels 225-1, . . . , 225-X substantially simultaneously. In at least one embodiment, each of the memory controllers 221-1, . . . , 221-X can receive a same command and address and drive the channels 225-1, . . . , 225-X substantially simultaneously. By using the same command and address, each of the memory controllers 221-1, . . . , 221-X can utilize the channels 225-1, . . . , 225-X to perform the same memory operation on the same memory cells (e.g., the memory operation is performed on memory cells that share a common address).

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be contemporaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

The PHY memory interfaces 224-1, . . . , 224-X can be an LPDDRx memory interface. In some embodiments, each of the PHY memory interfaces 224-1, . . . , 224-X can include data and DMI pins. For example, each PHY memory interface 224 can include four data pins (DQ pins) and one DMI pin. The media controllers 224-1, . . . , 221-X can be configured to exchange data (e.g., UDB and/or auxiliary data) with a respective number of memory devices 226-1, . . . , 226-X via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In some embodiments, DMI and DQ pins of a same memory die can be simultaneously utilized such that data can be transferred and/or exchanged from the memory die simultaneously via the DMI and DQ pins.

Memory channels 225-1, . . . , 225-X can work independently or work together as a whole. When memory channels 225-1, . . . , 225-X are working together, read data from each of the memory channels 225-1, . . . , 225-X must arrive at central controller 210 before any further processing of the read data. Therefore if the read data is not returned by the memory controllers 225-1, . . . , 225-X at the same time or read data is returned in a different order (e.g., commands are performed on memory devices in an order that is different than which the commands were received), the central controller 210 will not be able to further processes the read data which can add latency to the memory system. This latency can be introduced by a physical layer on a PHY memory interface 224 triggering training, the central controller 210 issuing different commands to memory controllers 221 on the number of memory channels, memory controller registers being programmed at different times, and/or memory controllers 221 running at different clock times, among other causes for latency.

In a number of embodiments, central controller 210 can be coupled to memory controllers 221-1, ..., 221-X via command bus 230. Command bus 230 can couple central controller 210 to each of the memory controllers 221-1, ..., 221-X. When the central controller 210 issues commands, the commands are sent to each of the memory controllers 221-1, ..., 221-X on the command bus 230. Central controller 210 sends commands on command bus 230 such that each of the memory channels 221-1, ..., 221-X receive the commands, therefore sending the commands on command bus 230 from central controller 210 to each of the memory controllers 221-1, ..., 221-X can ensure each the memory controllers 221-1, ..., 221-X receive the same command from central controller 210, thus reducing and/or eliminating latency in the memory system caused by different commands being received amongst the memory controllers 221-1, ..., 221-X. Central control 210 can send command on command bus 230 to each of the memory controllers 221-1, ..., 221-X to program registers on the memory controllers 221-1, ..., 221-X. Registers on the memory controllers 221-1, ..., 221-X can be programmed in response to receiving the command from the central controller 210 on command bus 230. Sending the commands on command bus 230 to each of the memory controllers 221-1, ..., 221-X can cause the registers on the memory controllers 221-1, ..., 221-X to be programmed at substantially the same time and substantially the same way.

In a number of embodiments, central controller 210 can be coupled to memory controllers 221-1, ..., 221-X via data bus 232. Data bus 232 can couple central controller 210 to each of the memory controllers 221-1, ..., 221-X. When the memory controllers 221-1, ..., 221-X are sending data to central controller 210 (in response to commands received from central control 210 via command bus 230), read data is sent from each of the memory devices 226-1, ..., 226-X, PHY memory interfaces 224-1, ..., 224-X, and memory controllers 221-1, ..., 221-X on data bus 232 to data buffer 228 on central controller 210. The memory controllers 221-1, ..., 221-X can send read data on data bus 232 such that central controller 210 receives the read data that corresponds to the commands sent to the memory controllers 221-1, ..., 221-X from central controller 210 via command bus 230. Therefore sending read data on the data bus 232, that couples central controller 210 to each of the number of memory controllers 221-1, ..., 221-X, from the memory controllers 221-1, ..., 221-X to central controller 210 can cause the central controller 210 to receive the read data at approximately the same time allowing the central controller 210 to continue processing the read date and reducing and/or eliminating latency in the memory system caused by different commands being received amongst the memory controllers 221-1, ..., 221-X and/or different read data being sent to the central controller 210.

Figure 3:
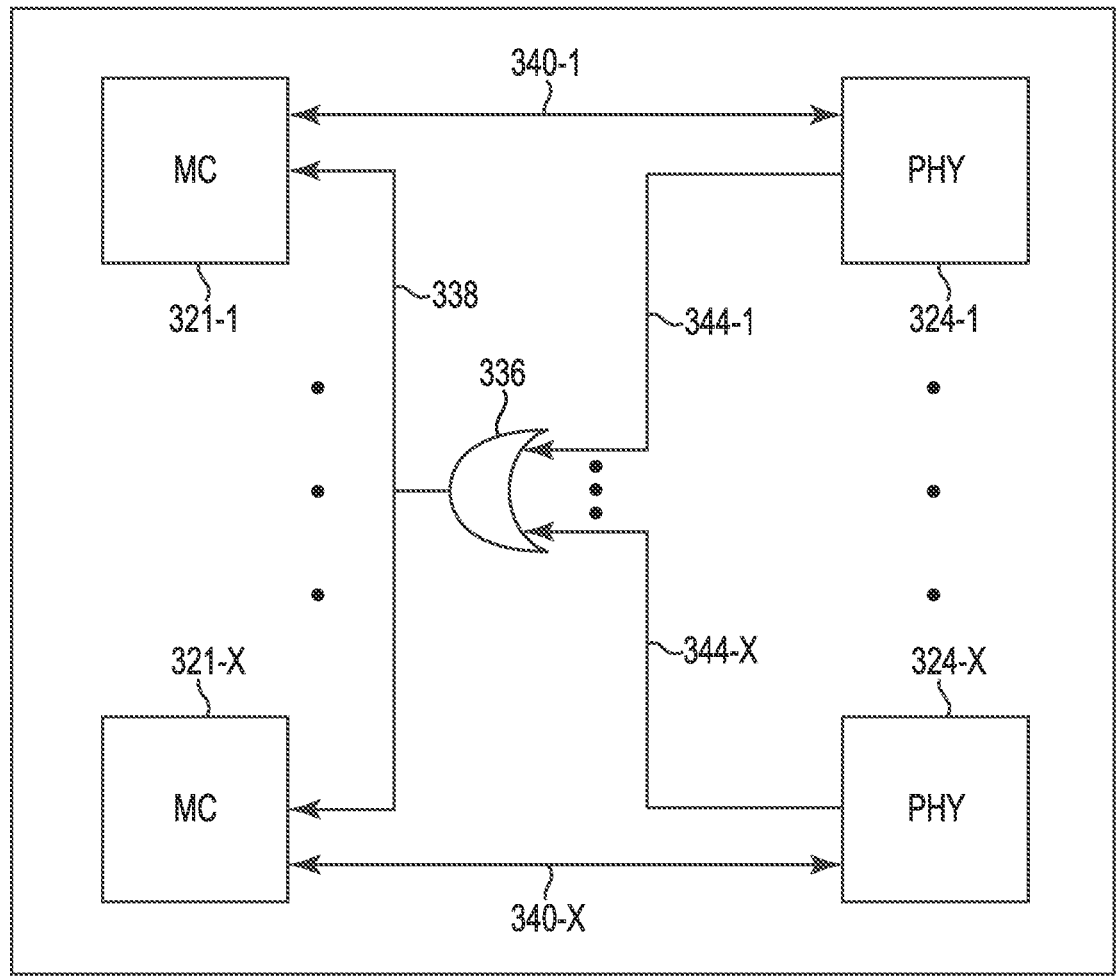
FIG. 3 is a block diagram of a controller configured for read data alignment in accordance with a number of embodiments of the present disclosure.

FIG. 3 is a block diagram of a controller configured for read data alignment in accordance with a number of embodiments of the present disclosure. FIG. 3 includes a back end portion (analogous to the back end portion 119 in FIGS. 1 and 219 in FIG. 2). Memory controllers 321-1, ..., 321-X and PHY memory interfaces 324-1, ..., 324-X can be analogous to memory controllers 221-1, ..., 221-X and PHY memory interfaces 224-1, ..., 224-X illustrated in FIG. 2.

In FIG. 3, memory controllers 321-1, ..., 321-X can be coupled to physical layers on PHY memory interfaces 324-1, ..., 324-X via a number of first portions 344-1, ..., 344-X of a side-band bus. The side-band bus can include a logic gate 336 such that any signal sent from one of physical layers on the side-band bus will be sent to each of the memory controllers 321-1, ..., 321-X via a second portion 338 of the sideband bus. The second portion 338 of the sideband bus couples the logic gate 336 to each of the memory controllers 321-1, ..., 321-X. The logic gate 336 can receive signals from any of the physical layers on the PHY memory interfaces 324-1, ..., 324-X via a number of first portions 344-1, ..., 344-X of a side-band bus. The logic gate 336 can send the signal received via a number of first portions 344-1, ..., 344-X of a side-band bus to each of the memory controllers 321-1, ..., 321-X via a second portion 338 of the side-band bus in response to receiving a signal from one or more of the physical layers on the PHY memory interfaces 324-1, ..., 324-X.

When one of the physical layers on PHY memory interfaces 324-1, ..., 324-X is busy (e.g., busy requesting and/or performing training), a notification (e.g., a first signal) that the physical layer is busy can be sent on one of the number of first portions 344-1, ..., 344-X of the side-band bus to logic gate 336. The notification can be received by the logic gate 336 and transmitted from the logic gate 336 to each of the number of memory controllers on second portion 338 of the side-band bus. When each of the memory controllers 321-1, ..., 321-X receives the notification, the memory controllers 321-1, ..., 321-X can block commands from being performed. The memory controllers 321-1, ..., 321-X can block command from being performed in response to receiving the notification while one or more of the physical layers on PHY memory interfaces 324-1, ..., 324-X are busy, therefore sending the notification on the side-band bus to each of the memory controllers 321-1, ..., 321-X can reduce and/or eliminate any latency in the memory system caused by one of the memory channels being unable to execute commands.

Memory controllers 321-1, ..., 321-X can be coupled to PHY memory interfaces 324-1, ..., 324-X via buses 340-1, ..., 340-X. The memory controller that is on the same channel as the physical layer that is busy can send an acknowledgement (e.g., a signal) to the physical layer that is busy via buses 340-1, ..., 340-X to indicate that the memory controller received the notification that the physical layer is busy. For example, when physical layer on PHY memory interfaces 324-1 sends a notification that the physical layer is busy to each of the memory controllers 321-1, ..., 321-X via the first portions 344-1, ..., 344-X, logic gate 336, and second portion 338 of the side-band, memory controller 321-1, which is on the same channel as physical layer on PHY memory interfaces 324-1, can send an acknowledgement of receiving the notification that the physical layer is busy on bus 340-1.

When one of the physical layers on PHY memory interfaces 324-1, ..., 324-X is no longer busy (e.g., a training operation is complete), another notification (e.g., a second signal) that the physical layer is no longer busy can be sent on a number of first portions 344-1, ..., 344-X of the side-band bus. The notification can be received by logic gate 336 and transmitted from logic gate 336 to each of the memory controllers 321-1, ..., 321-X via on second portion 338 of the side-band bus. Memory controllers 321-1, ..., 321-X can resume performing commands in response to receiving the notification. Memory controllers 321-1, ..., 321-X can resume performing commands in response to receiving the notification that indicates one or more of the physical layers are no longer busy, therefore sending the notifications on the side-band bus to each of the number of memory controllers can reduce and/or eliminate any latency in the memory system caused by one of the memory channels being busy and unable to execute commands.

Memory controllers 321-1, . . . , 321-X can be coupled to PHY memory interfaces 324-1, . . . , 324-X via buses 340-1, . . . , 340-X. The memory controller that is on the same channel as the physical layer that is no longer busy can send an acknowledgement (e.g., a signal) to the physical layer that is no longer busy via buses 340-1, . . . , 340-X to indicate that the memory controller received the notification that the physical layer is no longer busy. For example, when physical layer on PHY memory interfaces 324-1 sends a notification that the physical layer is no longer busy to each of the memory controllers 321-1, . . . , 321-X via the first portions 344-1, . . . , 344-X, logic gate 336, and second portion 338 of the side-band, memory controller 321-1, which is on the same channel as physical layer on PHY memory interfaces 324-1, can send an acknowledgement of receiving the notification that the physical layer is no longer busy on bus 340-1.

Figure 4:
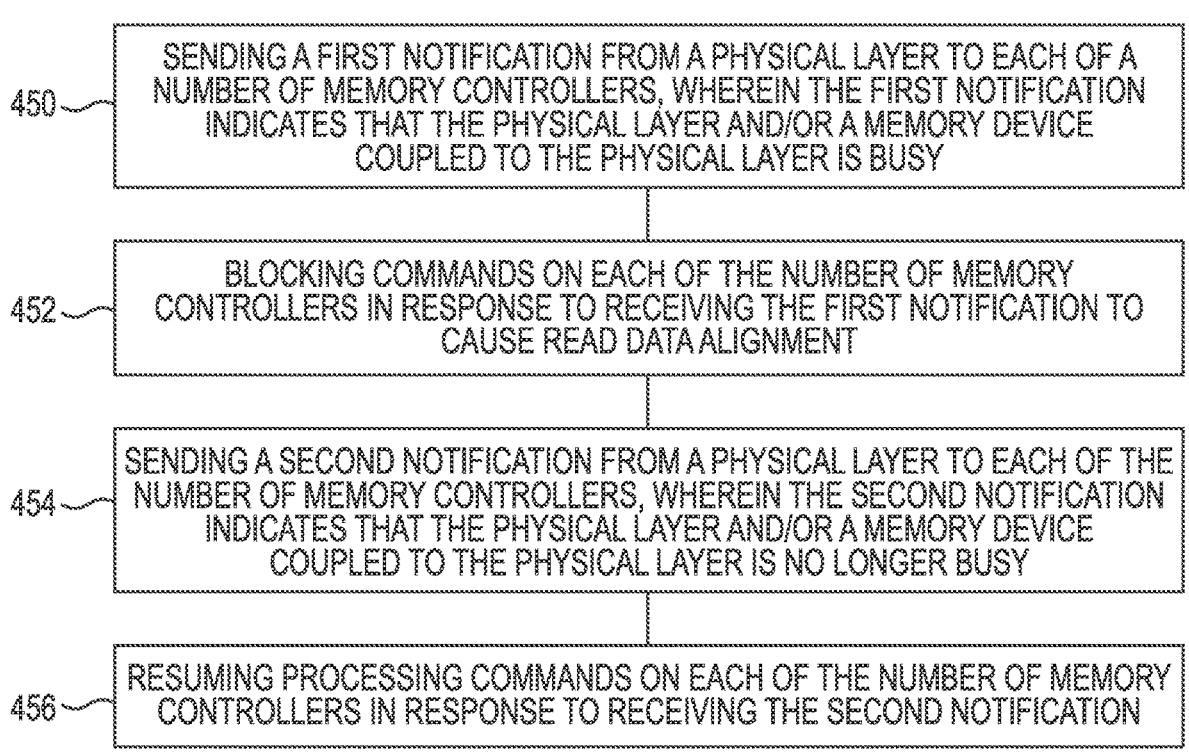
FIG. 4 is a flow diagram of a method for operating a controller configured for read data alignment in accordance with a number of embodiments of the present disclosure.

FIG. 4 is a flow diagram of a method for operating a controller configured for read data alignment in accordance with a number of embodiments of the present disclosure. The methods described herein can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 450, the method can include sending a first notification from a physical layer to each of a number of memory controllers, wherein the first notification indicates that the physical layer and/or a memory device coupled to the physical layer is busy.

The physical layer can be busy due to initiation of a training operation. Training operations can be initiated based on a change in temperature on the physical layer and/or memory device coupled to the physical layer.

At 452, the method can include blocking commands on each of the number of memory controllers in response to receiving the first notification to cause read data alignment.

The memory controllers can block commands from being performed while one or more physical layers are busy and unable to execute commands to cause read data alignment such that that the each of the physical layers are able to perform commands when the memory controllers send commands to the physical layers and the read data returned to the central controller is aligned (e.g., returned from the memory devices on each of the channels).

At 454, the method can include sending a second notification from the physical layer to each of the number of memory controllers, wherein the second notification indicates that the physical layer and/or the memory device coupled to the physical layer is no longer busy.

At 456, the method can include resuming processing commands on each of the number of memory controllers in response to receiving the second notification. The memory controllers can resume performing commands in response to receiving the second notification once one or more physical layers are no longer busy and unable to execute commands to ensure that the each of the physical layers are able to perform commands when the memory controllers resume sending commands to the physical layers.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   sending a first notification from a physical layer to each of a number of memory controllers, wherein the first notification indicates that the physical layer and/or a memory device coupled to the physical layer is busy and wherein the first notification is sent to a logic gate that routes the first notification from the logic gate to each of a number of memory controllers;
   blocking commands on each of the number of memory controllers in response to receiving the first notification to cause read data alignment;
   sending a second notification from the physical layer to each of the number of memory controllers, wherein the second notification indicates that the physical layer and/or the memory device coupled to the physical layer is no longer busy; and
   resuming processing commands on each of the number of memory controllers in response to receiving the second notification.

2. The method of claim 1, further including sending the first notification and the second notification on a side band bus.

3. The method of claim 1, further including sending the first notification and the second notification from the physical layer to each of the number of memory controllers via the logic gate.

4. The method of claim 1, further including sending an acknowledgement from one of the number of memory controllers to the physical layer in response to receiving the first notification.

5. The method of claim 1, further including sending an acknowledgement from one of the number of memory controllers to the physical layer in response to receiving the second notification.

6. The method of claim 1, further including performing a training operation on the physical layer while the commands are blocked on each of the number of memory controllers.

7. The method of claim 1, further including sending the first notification from the physical layer to one of the number of memory controllers on another bus.

8. The method of claim 1, wherein each of the number memory controllers is associated with one of a number of physical layers and further including performing a training operation on each of the number of physical layers while the commands are blocked on each of the number of memory controllers.

9. A method, comprising:
sending a command from a central controller to each of a number of memory controllers on a command bus;
sending the command from each of the number of memory controllers to each of a number of memory devices;
receiving data associated with the command from each of the number of memory devices at each of the number of memory controllers; and
receiving, at the central controller, the data associated with the command from each of number of memory controllers via a data bus, wherein the data associated with the command from each of the memory controllers is received at the central controller substantially simultaneously.

10. The method of claim 9, further including sending the command from the central controller to each of the number of memory controllers on the command bus such that each of the number of memory controllers receives the same command.

11. The method of claim 9, further including receiving, at the central controller, the data associated with the command from each of number of memory controllers via the data bus, such that the central controller receives the same data from each of the number of memory devices.

12. An apparatus, comprising:
a central controller;
a number of memory controllers coupled to the central controller via a data bus and a command bus, wherein each of the number of memory controllers include one of a number of physical layers; and
a number of memory devices, wherein each particular memory device of the number of memory devices is coupled to a particular memory controller of the number of memory controllers, wherein the apparatus is configured to:
send a first notification from a physical layer of the number of physical layers to each of the number of memory controllers, wherein the first notification indicates that the physical layer and/or a memory device of the number of memory devices coupled to the physical layer is busy and wherein the first notification is sent to a logic gate that routes the first notification from the logic gate to each of a number of memory controllers;
block commands on each of the number of memory controllers in response to receiving the first notification;
send a second notification from the physical layer to each of the number of memory controllers, wherein the second notification indicates that the physical layer and/or the memory device coupled to the physical layer is no longer busy; and
resume processing commands on each of the number of memory controllers in response to receiving the second notification.

13. The apparatus of claim 12, wherein the first notification is sent from the physical layer to each of the number of memory controllers on a side band bus.

14. The apparatus of claim 12, wherein the first notification is sent from the physical layer to the logic gate and from the logic gate to each of the number of memory controllers.

15. The apparatus of claim 12, wherein a training operation is performed on the physical layer while the commands are blocked on the number of memory controllers.

16. The apparatus of claim 12, wherein a command is sent from the central controller to each of the number of memory controllers on a command bus.

17. The apparatus of claim 12, wherein the command is sent from each of the number of memory controllers to a corresponding memory device of the number of memory devices.

18. The apparatus of claim 12, wherein data associated with the command is sent from each of the number of memory devices to the central controller.

19. The apparatus of claim 12, wherein a programming operation is performed on registers on each of the number of memory controllers.

20. The apparatus of claim 12, wherein a command to program registers on each of the number of memory controllers is sent on a command bus.

* * * * *